United States Patent [19]

Haas

[11] Patent Number: 5,566,225
[45] Date of Patent: Oct. 15, 1996

[54] WIRELESS DATA COMMUNICATIONS SYSTEM FOR DETECTING A DISABLED CONDITION AND SIMULATING A FUNCTIONING MODE IN RESPONSE TO DETECTION

[75] Inventor: Zygmunt Haas, Holmdel, N.J.

[73] Assignee: Lucent Technologies Inc., Murray Hill, N.J.

[21] Appl. No.: 342,495

[22] Filed: Nov. 21, 1994

[51] Int. Cl.$^6$ .................................................. H04Q 7/20
[52] U.S. Cl. ........................ 379/58; 379/60; 455/33.2
[58] Field of Search ............................ 379/58, 59, 60; 455/33.1, 33.2; 375/54.1, 54.2, 58.2; 370/79, 95.1, 110.1, 94.1

[56] References Cited

U.S. PATENT DOCUMENTS

| 4,654,867 | 3/1987 | Labedz et al. | 379/59 |
| 4,697,281 | 9/1987 | O'Sullivan | 379/59 |

OTHER PUBLICATIONS

"Comparing Four IP Based Mobile Host Protocolas" by Andrew Myles and David Skellern, Computer Networks and ISDN Systems 26 (1993) pp. 349–355.

Cellular Link is Step to Portable Office, J. Robert Lineback, McGraw–Hill, 1–2 Jun. 28, 1984.

Firm Unveils Cellular Bridge, Jim Bartimo, InfoWorld, p. 11 Jul. 2, 1984.

Introducing: The Bridge, Dialog File 621:New Product Announcements May 20, 1985.

Specturm Cellular Corporation Begins Demonstrations of the Bridge (TM), Dialog File 621:New Product Announcements Dec. 17, 1984.

*Primary Examiner*—Curtis Kuntz
*Assistant Examiner*—Lisa M. Coward
*Attorney, Agent, or Firm*—Frederick B. Luludis

[57] ABSTRACT

A system is arranged to a) monitor the flow of data communicated within a session between a mobile end-user device and a host via a connection which includes a wireless link established over a wireless network b) detect a disabled condition of the wireless link c) in response thereof, simulates a functioning mode of the session, and d) when the wireless link is restored, resume the session between the mobile end-user device and the host at the stage where the disabled condition occurred, as if a disconnect never occurred.

29 Claims, 4 Drawing Sheets

WIRELESS DATA COMMUNICATIONS SYSTEM FOR DETECTING A DISABLED CONDITION AND SIMULATING A FUNCTIONING MODE IN RESPONSE TO DETECTION

TECHNICAL FIELD

This invention relates to communication systems. More specifically, this invention relates to a system for providing wireless data communication services.

BACKGROUND OF THE INVENTION

Explosive growth in the market for portable computing devices, (laptop, palmtop, notebook, and personal digital assistants) coupled with the increasing popularity of wireless communications has provided the impetus for a greater demand for wireless data networking services. However, the introduction of the mobility factor in data networks brings into the networking equation challenging complexities, heretofore unknown in traditional wired data networks. For example, unlike a wired data network wherein a connection is fixed and relatively stable during a session, in wireless data networks, a connection that couples, for example, a mobile end-user device to a host connected to a wired network, may change frequently. These changes may be caused by a variety of factors including variations in the physical medium of the wireless link (e.g., Radio Frequency or Infra-Red signals) or by the effects of user mobility that require frequent reconfiguration of the connection.

Chief among those factors is the so-called "hand-off" procedure which allows mobile end-user devices, as they change their physical locations, to change their point of attachment with hardware (referred to as "base station") in the data network. An equally important factor is the frequent occurrence of loss or degradation of wireless signals caused, for example, by a) Rayleigh fading, b) shadow fading due to obstruction from natural and man-made objects around the main transmission path of the mobile end-user devices, and c) interference between co-channels and adjacent channels of wireless networks serving mobile end-user devices.

One of the effects of the above factors is that the communication between the mobile device and the fixed network is sometimes disrupted which causes a disconnect to occur. Disconnects can also be caused by other factors, such as a user simply turning off the mobile end-user device. Thus, the duration of disconnects can be a fraction of a second (e.g., when the radio path is obstructed by an object), several seconds (e.g., when a mobile end-user device roams into an area with no radio coverage, such as in between two cells described below), and up to hours or days (e.g., when a mobile end-user device is turned off).

The frequency in which disconnects occur is likely to increase in the future because an increasing number of portable end-user devices are designed to operate in a "disconnected" or doze mode to conserve limited battery power in those devices. Another factor that may cause an increase in the number of disconnects in future wireless networks is the trend to reduce cells size (a cell being the area served by a single base station). This trend is motivated by increase in frequency spectrum reuse to conserve that precious resource. Thus, microcells, and picocells are being planned to replace today's macrocells. Unfortunately, the beneficial effect of increased spectrum reuse is achieved at the price of increased hand-offs and, consequently, higher chances of short-term disconnects. Thus, it is desirable to support disconnects in a manner that is, if not user-transparent at least, non-disruptive to the communications and computing operations of mobile end-user devices.

SUMMARY OF THE INVENTION

The present invention is directed to a system which a) monitors the flow of data during a communication session between a mobile end-user device and a host via a wireless link established over a wireless network b) detects an inoperative condition of the wireless link c) in response thereto, simulates the operative mode of the session, and d) when the wireless link is restored, resumes the session between the mobile end-user device and the host at the stage where the inoperative condition occurred, as if a disconnect never occurred.

As used in this disclosure the term "session" refers to an association between two processors. A session is not limited to a long-term virtual-circuit type of association. It also includes a short-term, transaction-oriented association.

In an embodiment of the principles of the invention, a session is initially established between a mobile end-user device and a host. As part of that session, a process called "end-user application process (EAP)" is invoked in the mobile end-user device while another process called "host application process (HAP)" is invoked in the host. Examples of application processes include communications transport protocol software, such as TCP, or a user application, such as a database query. The term "application process" as used in this disclosure does not necessarily refer to the Application layer of the ISO/OSI model. Application process in this disclosure includes the upper layers of the ISO/OSI model, i.e., transport through application layers.

In order for the session to remain active, the two application processes need to communicate since any disruption of the session communications may cause the two application processes to enter an unrecoverable state. To prevent this from happening, two special processes, termed "Agents", are invoked when the application processes are invoked. One of the Agents (hereinafter called "Local Agent") is executed in the mobile end-user device, while the other Agent (hereinafter referred to as "Network-Based Agent") is executed in a processor in the wireless network or in the host. Specifically, when session communication is disrupted, the Local Agent is designed to simulate the behavior of the HAP such that the EAP "believes" that the session communication has not been disrupted. Similarly, when session communication is disrupted, the Network-Based Agent is arranged to simulate the behavior of the EAP such that the HAP "believes" that session communication has not been disrupted.

As long as the wireless link which supports the session communication is operational, the Local Agent and the Network-Based Agent silently monitor the packet flow between the EAP and the HAP. Upon detecting the inoperative condition of the wireless link, the Local Agent and the Network-Based Agent enter the disconnect-state. Specifically, the Network-Based Agent responds to control packets from the HAP, while the Local Agent responds to control packets from the EAP. The response is limited to transmitting signals indicating to the respective application processes on the other end of the connection is operational. However no application process (AP) functionality needs to be performed by the Agents.

When the communications facilities for the session are restored, synchronization takes place between the Local Agent and the Network-Based Agent to allow the EAP and the HAP to resume the session at the stage before the disconnect. The synchronization is necessary to avoid any loss of information that may have occurred during the disconnect stage.

DETAILED DESCRIPTION

Figure 1:
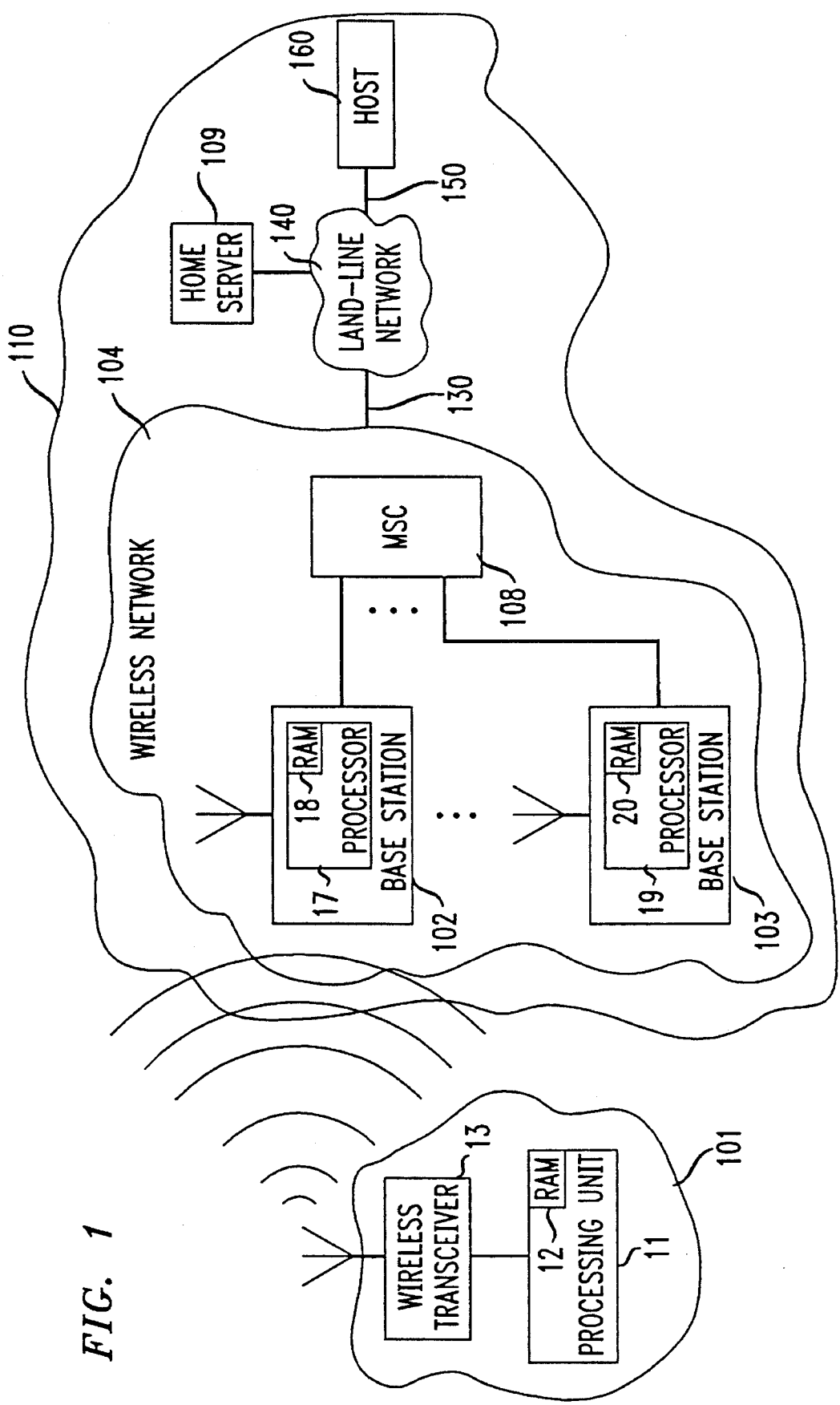
FIG. 1 shows in block diagram form, an illustrative communication switching system which includes a wireless data network designed in accordance with the principles of the invention.
Figure 2:
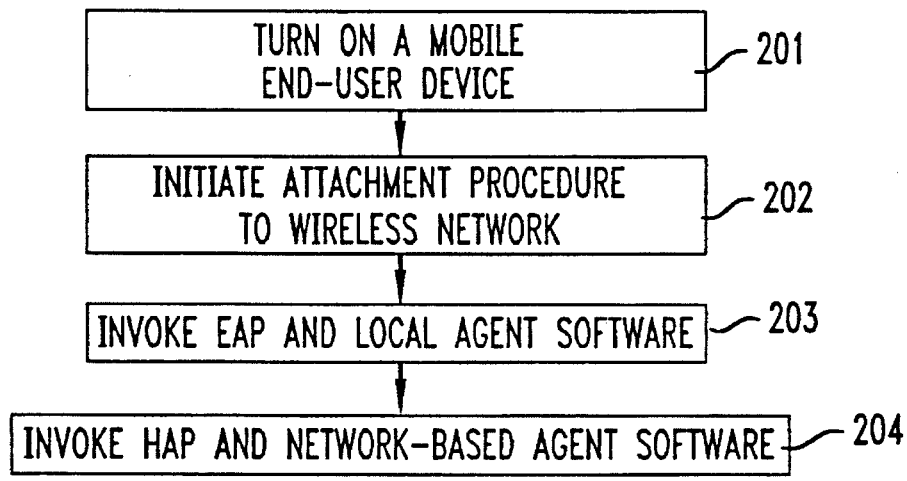
FIG. 2 is a flowchart which outlines a logical sequence of programmed instructions executed by the processing unit of a mobile end-user device.
Figure 5:
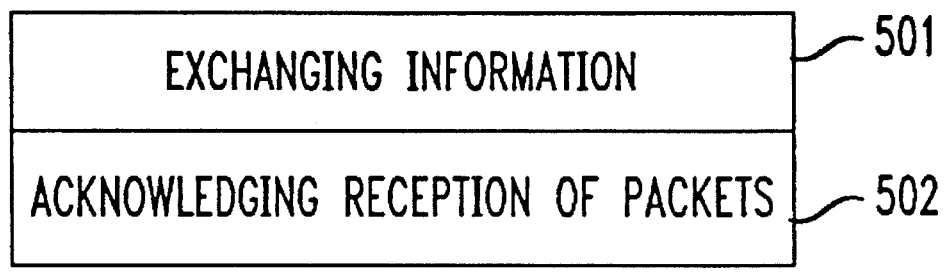
FIG. 5 displays a set of instructions stored in the memory of the mobile end-user device of FIG. 1.

FIG. 1 shows in block diagram form, an illustrative communication switching system which includes a data network 110 designed in accordance with the principles of the invention. Shown in the block diagram of FIG. 1 is a mobile end-user device 101 which is arranged to communicate, for example, with a stationary host 160 via a wireless network 104 and a land-line network 140. Mobile end-user device 101 includes a wireless transceiver 13 (optionally with a built-in modem not shown) and a processing unit 11 which executes the programmed instructions (stored in RAM 12) of an end-user communications software program called "the Local Agent". Some of the instructions of the Local Agent are shown in FIGS. 2 and 5 and are described in detail below.

Also stored in RAM 12 are programmed instructions for one or more end-user application process (EAP) for access to the computing services of host 160. Those end-user application processes may be, for example, communications transport protocol software, such as TCP, or client/server access procedures.

When mobile end-user 101 is energized, it initiates a connection set-up procedure to establish a wireless communication link between itself and base-station 102 or 103. The connection set-up procedure is well known to those skilled in the art. When an end-user application process is invoked in mobile end-user device 101, the Local Agent is automatically invoked. The invocation of the Local Agent may be implemented, for example, as part of the Operating System running on processing unit 11. The Local Agent silently monitors data exchanged as part of a session between the mobile end-user device 101 and stationary host 160. EAP and HAP exchange signaling messages when the communications facilities that are used in the connection are idle. Those signaling messages take the form of control packets also known as "keep-alive" packets, and acknowledgement packets. When the Local Agent notices that a keep-alive packet transmitted by the EAP has not been acknowledged within a predetermined time window, the Local Agent "infers" that the session communication has been disrupted. Alternatively, when the Local Agent notices that no keep-alive packet has been transmitted by the HAP over an idle connection for a predetermined time window, the Local Agent "infers" that the session communication has been disrupted. When the session communication is disrupted, the Local Agent uses the instructions stored in area 501 and 502 to respond to keep-alive packets from the EAP. Similarly, the Network-Based Agent responds to keep-alive packets from the HAP. Accordingly, the HAP and the EAP "infer" that the wireless link is operative upon receiving either a keep-alive packet or acknowledgement of a previously transmitted keep-alive packet.

Each of the base stations 102 and 103 includes a transceiver which is arranged to wirelessly communicate with mobile end-user device 101 when the latter is located in the area of the base station. That area is referred in the art as a "coverage area" or "cell". Base stations 102 and 103 are the points of access and egress for data transmitted to, and received from, cellular network 104. For call setup functions, base stations 102 and 103 perform initial attachment procedure and supervise the establishment of the wireless link. Base stations 102 and 103 also tear down the wireless link at the end of a data call.

Of particular significance is the function of base stations 102 and 103 to hand-off or transfer a data call from a channel of base station 102 to a channel of base station 103, as mobile end-user device 101 moves within the geographic area covered by wireless network 104. The hand-off function is described in further detail below.

Also shown as a hardware component of wireless network 104 is Mobile Switching Center (MSC) 108. The latter provides a seamless communications path for a data call by "bridging" a wireless channel and a "wired" channel that is established over land-line communications network 140. Specifically, MSC 108 selects a) an outgoing channel from trunk 130 to land-line network 140, and b) a wireless channel of the wireless transceivers of base station 102 or 103 and the wireless transceiver of mobile end-user device 101. Thereafter, MSC 108 sends a data message to the base station from which the connection setup signals were received, to instruct the mobile end-user device 101 to tune to the selected radio channel. MSC 108 also provides an interface to the support systems for Operations, Administration and Maintenance (OA&M) functions. Furthermore, MSC 108 terminates the signaling links of a signaling network (not shown) that is used to exchange call handling messages from land-line network 140 to wireless network 104, according to a specific protocol, such as the well-known Signaling System 7 (SS7).

Figure 3:
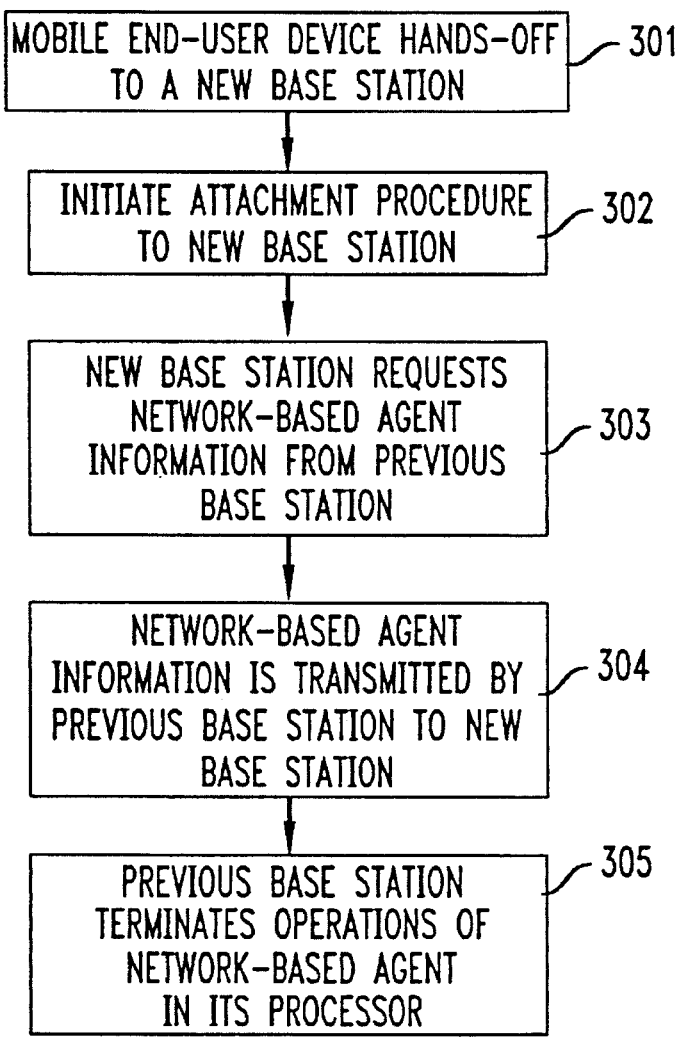
FIG. 3 is a flowchart outlining the logical events that occur during a hand-off.
Figure 4:
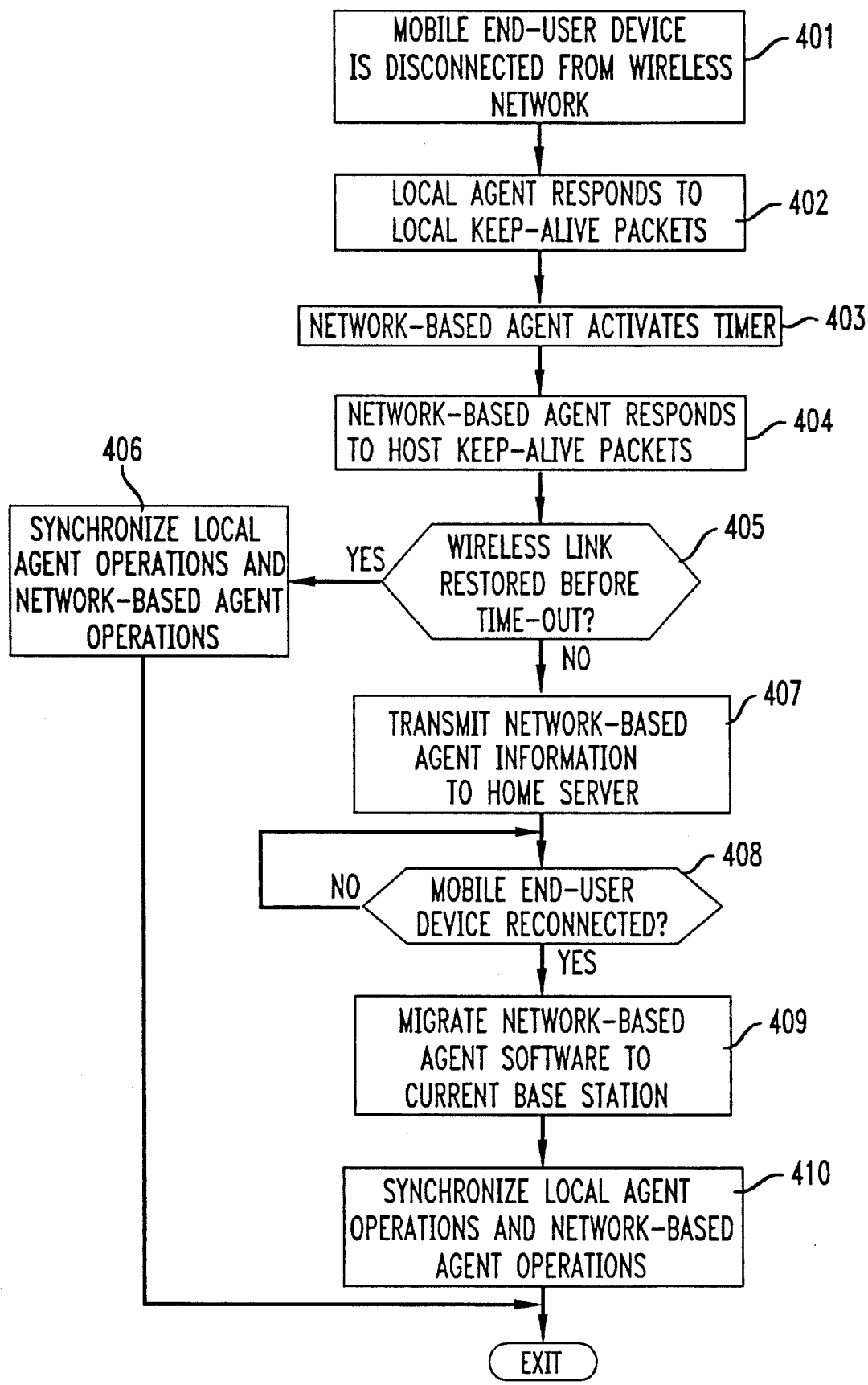
FIG. 4 presents in flow diagram format, different programmed instructions executed by the processor(s) of the communication switching system of FIG. 1 to provide data communications services to mobile end-users in accordance with the principles of the invention.
Figure 6:
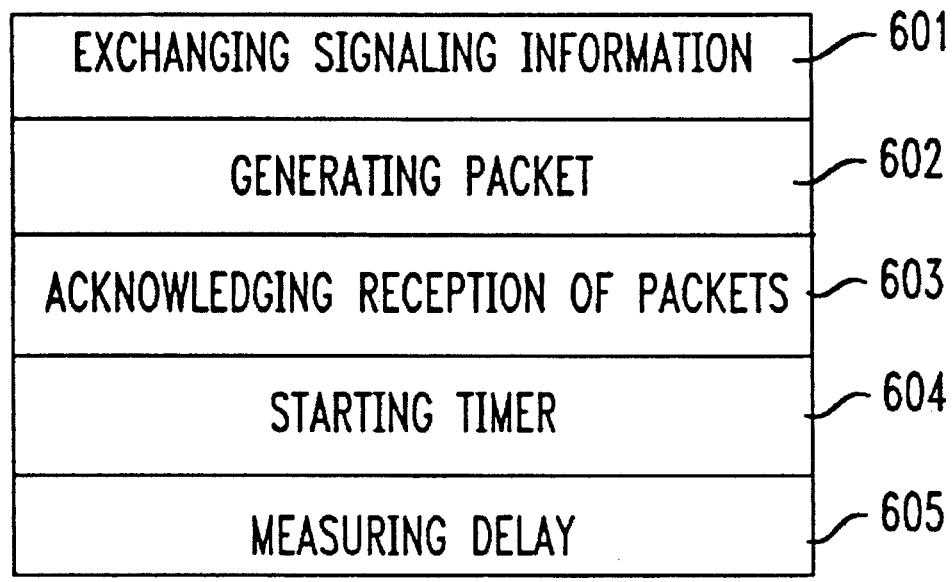
FIG. 6 shows a set of instructions stored in the memory of at least one processor of the data network of FIG. 1 to implement the principles of the invention.

Of particular importance among the components of base station 102 (103) is processor 17 (19) which executes the programmed instructions (some of which are shown in FIGS. 3, 4 and 6 described below) of a network-based communications software program called "Network-Based Agent" that is stored in RAM 18 (20). FIG. 6 shows a memory area map of RAM 18 and 20.

When a connection which includes a wireless link, is established between mobile end-user device 101 and stationary host 160, the Network-Based Agent monitors exchange of data over that wireless link and registers in a file all information associated with that connection. As long as mobile end-user device 101 maintains connectivity to base station 102 or 103, the operation of the Network-Based Agent is limited to compensating for higher than usual delays that may occur on wireless network 104. Those delays may be due, for example, to excessive transmission errors or low available bandwidth. The delay-compensating function is performed by the Network-Based Agent executing the instructions stored in memory area 605, 603 and 601 to measure the delay in the wireless network 104 and to generate and transmit dummy packets to stationary host 160. Advantageously, this function allows higher effective throughput over the wireless link by preventing certain congestion control mechanisms to be automatically triggered due to delays in the network. For example, certain transport protocols, such as the widely used Transport Control Protocol (TCP) interpret long delays as affirmative signs of congestion or loss of packets and, accordingly, initiate congestion control or retransmission procedures resulting in decrease of effective throughput over the wireless link. The transmission of the dummy packets prevents the congestion control or retransmission mechanisms from being triggered.

When the Network-Based agent notices that no keep-alive packets or acknowledgment packets are being exchanged over an idle connection between the EAP and the HAP, the Network-Based Agent "infers" that the session communication has been disrupted.

When the wireless link is inoperative, the Network-Based Agent executes the instructions stored in memory area 604 to activate a timer and to emulate the operating mode (e.g. networking protocol and/or application) behavior of mobile end-user device 101 in order to maintain connectivity to stationary host 160 on behalf of the mobile end-user device 101. The behavior emulation procedure is described in further detail below. If the timer expires before the wireless link is restored, the Network-Based Agent moves all information associated with the connection and the current state of the Network-Based Agent to home server 109 which is a host arranged to emulate the communications protocol and application behavior of mobile-end user device 101. When the wireless link is restored, the Network-Based Agent migrates to a current base station and returns to its limited packet compensation role.

Although in this example, the programmed instructions of the Network-Based Agent are stored in RAM 18 (20) and executed in processor 17 (18) of base station 102 (103), it is to be understood that the programmed instructions of the Network-Based Agent can be executed by any processor of the data network 110, including host 160.

Referring to FIG. 2, the data communications services afforded by the invention are initiated in step 201, when mobile end-user device 101 is powered on, or enters into the coverage area of base station 102 or 103. The mobile end-user device 101, in step 202, initiates a connection set-up procedure to establish a communication link between itself and base station 102, for example. The connection set-up procedure is well known to those skilled in the art. When an end-user application process (EAP) is invoked on the mobile end-user device 101, in step 203, the two Agents are automatically invoked. Specifically, the Local Agent is invoked in mobile end-user device 101 while the Network-Based Agent is invoked, in step 204 on base station 102, for example. Invocation of the two Agents may be implemented, for example, as part of the Operating System running on processing unit 11 of mobile end-user device 101 and processor 17 (18) running on base-station 102 (103).

FIG. 3 illustrates a routine to handle hand-offs according to the principles of the invention. As mobile end-user device 101 travels across the geographical area served by wireless network 104 and signal strength measurements from base stations 102 and 103 indicate that hand-off is needed, mobile end-user device 101, as shown in step 301, initiates hands-off procedure from base station 102 to base station 103, for example. Prior art attachment procedures are performed, as indicated in step 302, to assign a new set of channels that are associated with base station 103 for access to the wireless network 104. When mobile end-user device 101 hands-off from base station 102 to base station 103, mobile end-user device 101 indicates to base station 103 that the Network-Based Agent is running on base-station 103. Accordingly, base station 103, as illustrated in step 303, requests from base station 102 all information associated with the connection, including the "current state" of the Network-Based Agent. Upon receiving that information, as indicated in step 304, base station 103 starts execution of a new version of the Network-Based Agent. When the Network-Based Agent running on processor 17 of base station 102 stops receiving packets from both mobile end-user 101 and stationary host 160, it terminates its operations.

FIG. 4 shows in flow diagram format, the instructions executed by base station 102 and mobile end-user device 101 when the wireless link connecting mobile end-user device 101 and base station 102 is inoperative. When mobile end-user device 101 is disconnected from the wireless network 104, as indicated in step 401, the Local Agent enters a disconnect state and, as shown in step 402, starts responding to local keep alive packets generated for example, by the End-user Application Process (EAP) running on processing unit 11 of mobile end-user device 101. Similarly, as illustrated in step 403, Network-Based Agent running on processor 17 of base station 102 enters a disconnect state and retrieves from memory area 604 instructions that are executed to activate a timer. Subsequently, the Network-Based Agent, as shown in step 404, responds to network keep alive packets received from a Host Application Process (HAP) running on stationary host 160. As an example, consider the case when the two Application Processes are two TCP instances. When the connection is broken, the Agents respond to the keep-alive packets from the TCP processes. The Agents may even reduce the window (used for flow-control) to zero in order to prevent any data packets from being sent.

A determination is made in step 405 as to whether the wireless link is restored before a predetermined time period clocked by the timer. If so, in step 406, the Local Agent and the Network-Based Agent resynchronize. The synchronization process is necessary to avoid any loss of information that may have occurred during the disconnect period. If mobile end-user device 101 reconnects to base station 102, from which it was disconnected, the Network-Based Agent returns to its delay-compensating function following synchronization. If mobile end-user device 101 is reconnected, for example, to base station 103, the Network-Based Agent is invoked in processor 19 and the current state of the Network-Based Agent that was running in processor 17 is downloaded to processor 19. Thereafter, the operations of the Network-Based Agent in processor 17 are terminated.

If the wireless link is not restored before the timer expires, base station 103, in step 407 forwards information associated with the connection, including the current state of Network-Based Agent to home server 109. When the wireless link is restored, as determined in step 408, the Network-Based Agent information associated with the connection that was stored in home server 109 is downloaded, in step 409 to the current base station. Thereafter, in step 410, resynchronization of Local Agent and Network-Based Agent occurs, as described above.

The foregoing is to be construed as only being an illustrative embodiment of this invention. Persons skilled in the art can easily conceive of alternative arrangements providing functionality similar to this embodiment without any deviation from the fundamental principles or the scope of this invention.

I claim:

1. A method of providing data communications services to users of a wireless network, the method comprising the steps of:

initiating a data communication session between a mobile end-user device and a host apparatus over a wireless link established over the wireless network;

monitoring within the wireless network the data communication session;

detecting within the wireless network a disabled condition of the wireless link; and in response to the detection of the disabled condition of the wireless link, simulating a functioning mode of the data communication session between the mobile end-user device and the host apparatus until the wireless link is restored.

2. The method of claim 1 further comprising the step of:

resuming the session between the mobile end-user device and the host apparatus at the stage where the disabled condition occurred, when a particular signal indicative of restoration of the wireless link is received.

3. The method of claim 1 wherein the simulating step includes the steps of:

receiving within the wireless network and on behalf of the mobile end-user device at least one signaling message transmitted to the mobile end-user device by the host apparatus; and acknowledging within the wireless network reception of said at least one signaling message.

4. The method of claim 1 wherein said simulating step further comprises the steps of:

invoking a local agent process executed in a processing unit of the mobile end-user device;

generating at least one signaling message in said local agent to respond to at least one signaling request received from a session application executed on the mobile end-user device.

5. The method of claim 1 further comprising the step of:

invoking a network-based agent process executed in a processor of the wireless network; and transmitting to the host apparatus a null signaling message generated by the network-based agent when a delay exceeding a selected amount of time is present in the wireless network in order to prevent procedures which include congestion control and re-transmission request from being initiated by the host apparatus.

6. The method of claim 1 wherein said simulating step further comprises the steps of:

invoking a network-based agent process executed on the host apparatus; and generating at least one signaling message in said network-based agent to respond to at least one signaling request received from a session application executed on the host apparatus.

7. A method of providing data communications services to a mobile end-user, the method comprising the steps of:

establishing a data communication session between applications processes initiated respectively, at a mobile end-user device and a host apparatus, said data communication session being carried via a wireless connection established over a wireless network;

invoking as part of said data communication session separate agent processes, which include a local agent process on said mobile end-user device and a network-based agent process on a processor to monitor said connection; and in response to a signal indicative of a break in the wireless connection, simulating said data communication session using at least one of the agent processes to prevent termination of said data communication session, said simulating step being performed by exchanging information between at least one of said application processes and at least one of said agent processes.

8. The method of claim 7 wherein said processor on which said network-based agent is invoked is the host apparatus on which one of the application processes is invoked.

9. The method of claim 7 wherein said simulating step includes the steps of:

responding in said local agent to at least one signaling message which is a) transmitted by the application process being executed on the mobile end-user device, and b) directed to the application process being executed in the host apparatus; and responding in said network-based agent to at least one signaling message which is a) transmitted by the application process being executed on the host apparatus and b) directed to the application process being executed on said mobile end-user device.

10. The method of claim 7 further comprising the step of:

resuming the data communication session at the point where the break occurred in response to a signal indicating that the wireless connection has been restored.

11. The method of claim 10 wherein said resuming step includes the step of:

synchronizing the local agent process operations with the network-based agent process operations.

12. The method of claim 7 further comprising the steps of:

starting a timer at said processor after the break occurred; and moving the current state of the network-based agent process to a computer system connected to said wireless network, if the connection has not been restored after the timer expires.

13. The method of claim 12 further comprising the steps of:

moving the current state of the network-based agent from said computer system to a processor of a current base station on which a new version of the network-based agent is invoked.

14. The method of claim 7 further comprising the step of:

transferring the current state of the network-based agent from a first processor to a second processor as part of a hand-off process within the wireless network for said wireless connection, 15. A mobile end-user device comprising a memory which stores software program instructions for connection management functions, said functions including setting up a connection over a wireless network for a data communication session between said mobile end-user device and a host, wherein said session involves an application process being executed on said mobile end-user device; and a processor which a) assesses whether the connection is alive; and b) in response to receiving a signal indicating that said connection is dead, executes said software program instructions associated with said application process for simulating the data communication session to prevent the data communication session from being terminated by the mobile end-user device.

16. Apparatus for use in a wireless communications network comprising a memory which stores network-based agent software that is invoked when a connection is established to initiate a session between a mobile end-user device and a host connected to said wireless communications network;

a processor which a) generates in said apparatus signaling messages that are transmitted to the host, said signaling messages being generated in response to delays in the wireless communications network in order to inhibit at the host initiation of procedures which include congestion control and re-transmission request; b) ascertains whether said connection is alive; and c) simulates a functioning mode of the mobile end-user device, said simulation being initiated in order to prevent the host from initiating a session termination procedure when the processor receives a signal indicating that the connection is dead.

17. A system for providing wireless data communications services to users of a wireless network, the system comprising:

a memory which stores programmed instructions that are executed by a first processor in a mobile end-user device in order to initiate a data communication session between said mobile end-user device and a host apparatus over a wireless connection established over the wireless network; and a second processor in said wireless network which a) monitors within the wireless network the data communication session; b) detects within the wireless network a disabled condition of the wireless connection, and c) in response to said detection of said disabled condition of said wireless connection, simulates a functioning mode of the connection between the mobile end-user device and the host apparatus until the wireless connection is restored.

18. The system of claim 17 wherein said second processor in response to receiving a particular signal indicative of a restoration of the wireless connection, resumes the data communication session between the mobile end-user device and the host at the stage where the disabled condition occurred.

19. The system of claim 17 wherein said second processor simulates the functioning mode of the connection by a) receiving on behalf of the mobile end-user device at least one signaling message transmitted thereto by the host apparatus; and b) transmitting signaling data to said host apparatus in order to acknowledge reception of said at least one signaling message.

20. The system of claim 17 wherein said first processor a) invokes a local agent process that is executed; to generate at least one signaling message in said local agent to respond to at least one signaling message received from a session application being executed on said first processor.

21. The system of claim 17 wherein said second processor transmits to the host apparatus a null signaling message generated said second processor when a delay exceeding a selected amount of time is present in the wireless network, said signaling message being transmitted in order to prevent procedures which include congestion control and re-transmission request from being initiated by the host apparatus.

22. A system of providing data communications services to mobile end-user devices, the system comprising:

a first processor in a mobile end-user device which executes programmed instructions of a local agent software as part of setting up a data communication session between the mobile end-user device and a host over a wireless link of a wireless network a second processor which is designed to a) execute software program instructions of a network-based agent software,; b) determine whether the wireless link is alive; c) compensates for delays occurring in said wireless network when said delays exceed a selected amount of time and d) simulates a functioning mode of the wireless link in response to receiving a signal indicative of a disabled condition of the wireless link.

23. The system of claim 22 wherein said second processor compensates for said delay by transmitting to the host null signaling messages generated by the network-based agent to prevent the host from initiating procedures which include congestion control and re-transmission request.

24. The system of claim 22 wherein said second processor, in response to receiving a signal indicating that said disabled wireless link has been restored, transmits signaling data to at least one of a) said first processor and b) said host to resume the data communication session between the mobile end-user device and the host at the point where the disabled condition occurred.

25. The system of claim 22 wherein said second processor resumes said data communications session by synchronizing the operations of the local agent with the operations of the network-based agent.

26. The system of claim 22 wherein said second processor a) starts a timer after it determines the disabled condition of the wireless link; and moves the current state of the network-based agent to a third processor when the wireless link is still in the disabled condition after the timer expires.

27. The system of claim 26 wherein the current state of the network-based agent is moved from the third processor to a fourth processor associated with a current base station connected to said mobile end-user device when said wireless link has been restored.

28. The system of claim 22 wherein said first processor executes instructions in the local agent to prevent an end-user application accessed as part of the session from being terminated by the mobile end-user device when said wireless link is in said disabled condition.

29. The system of claim 22 wherein said second processor is located in a first one of the base stations of the wireless network, and wherein said second processor transfers the current state of the network-based agent from said first one of the base stations to a second one of the base stations as part of a hand-off process between said base stations within the wireless network.

* * * * *